United States Patent
Zhao et al.

(10) Patent No.: US 9,412,098 B1
(45) Date of Patent: Aug. 9, 2016

(54) SYSTEMS AND METHODS FOR DAILY TASK OPTIMIZATION

(71) Applicant: MasterCard International Incorporated, Purchase, NY (US)

(72) Inventors: Michael Zhao, New York, NY (US); Jeremy Pastore, Brooklyn, NY (US); Arun Elangovan, Astoria, NY (US)

(73) Assignee: Mastercard International Incorporated, Purchase, NY (US)

( * ) Notice: Subject to any disclaimer, the term of this patent is extended or adjusted under 35 U.S.C. 154(b) by 22 days.

(21) Appl. No.: 14/600,381

(22) Filed: Jan. 20, 2015

(51) Int. Cl.
*G06Q 10/10* (2012.01)
*G06Q 10/06* (2012.01)
*G08G 1/0968* (2006.01)
*G08G 1/123* (2006.01)
*G01C 21/00* (2006.01)
*G01C 21/20* (2006.01)
*G06Q 50/10* (2012.01)

(52) U.S. Cl.
CPC .......... *G06Q 10/1097* (2013.01); *G01C 21/005* (2013.01); *G01C 21/20* (2013.01); *G06Q 10/067* (2013.01); *G06Q 10/06311* (2013.01); *G06Q 10/06312* (2013.01); *G06Q 10/06316* (2013.01); *G06Q 10/063114* (2013.01); *G06Q 10/063116* (2013.01); *G06Q 50/10* (2013.01); *G08G 1/096816* (2013.01); *G08G 1/096844* (2013.01); *G08G 1/096883* (2013.01); *G08G 1/096888* (2013.01); *G08G 1/123* (2013.01)

(58) Field of Classification Search
CPC ............... G06Q 10/06311; G06Q 10/063116; G06Q 10/06316; G06Q 10/067; G06Q 10/1097; G06Q 10/06312; G06Q 10/063114; G06Q 50/10; G08G 1/123; G08G 1/096816; G08G 1/096844; G08G 1/096883; G08G 1/096888; G01C 21/20; G01C 21/005
See application file for complete search history.

(56) References Cited

U.S. PATENT DOCUMENTS

| | | | | |
|---|---|---|---|---|
| 8,019,622 B2* | 9/2011 | Kaboff | .................... | G06Q 10/00 342/357.25 |
| 8,166,410 B2* | 4/2012 | Tadman | ............... | G01C 21/343 701/425 |
| 8,401,790 B2* | 3/2013 | Eisele | .................... | G01C 21/20 340/995.19 |
| 8,919,646 B1* | 12/2014 | Beveridge | ............. | G06F 17/243 235/382 |
| 2002/0077841 A1* | 6/2002 | Thompson | ......... | A61N 1/37235 705/3 |
| 2003/0028399 A1* | 2/2003 | Davis | .................... | G06F 19/327 705/2 |
| 2005/0060198 A1* | 3/2005 | Bayne | .................... | A61B 5/411 705/2 |
| 2011/0307272 A1* | 12/2011 | Kaboff | .................... | G06Q 10/00 705/2 |
| 2013/0332216 A1* | 12/2013 | George | .......... | G06Q 10/063114 705/7.15 |
| 2014/0046711 A1* | 2/2014 | Borodow | ....... | G06Q 10/063114 705/7.15 |

* cited by examiner

*Primary Examiner* — Russell Frejd
(74) *Attorney, Agent, or Firm* — Leason Ellis LLP (57) ABSTRACT

A system and method is disclosed for determining an optimized sequence of visits by a consumer to a plurality of merchant locations irrespective of travel distance. The system is configured to receive, from the consumer, errand data including start time and start and finish location and a plurality of merchant locations to visit. The system also generates one or more models for predicting visit durations the merchant locations as a function of time using transaction data and location data associated with a plurality of consumers that previously visited the merchant locations. Based on the generated models, and current and historical travel/traffic information and the errand data, the system generates an optimized sequence of visits for the consumer.

17 Claims, 4 Drawing Sheets

SYSTEMS AND METHODS FOR DAILY TASK OPTIMIZATION

TECHNICAL FIELD OF THE DISCLOSURE

This patent application relates generally to the field of automated task planning systems, and more particularly to systems and methods for planning optimized sequences of tasks based on consumer location data, purchase data and travel data as exchanged and processed from multiple components.

BACKGROUND OF THE DISCLOSURE

In general, current systems and methods for planning a sequence of errands (e.g., visits to various merchant locations) are highly inefficient as they rely on personal experience and limited information from online resources.

Important decisions in the planning process (e.g., Which merchant locations should be visited? What is the order of visits? How long will each visit take?) are largely made based on personal experiences and a limited amount of information from online sources. For example, online resources such as the Google Maps service provided by Google Inc. of Mountain View, Calif., are useful in identifying locations to visit and routes between locations. However, map services have limited value in that they generally display only current travel/traffic information and are not particularly helpful for accurately determining travel time for a future segment of the trip. Moreover, such services fail to provide any information as to how long it will take to actually visit a particular location. As a result, consumers generally default to planning the sequence of visits and the route based on travel distance and without regard to how long it takes to actually visit a location. Ultimately, because planning a trip and the particular sequence of the visits is based largely on a consumer's limited knowledge, the trips are often not planned effectively and time is often wasted.

Accordingly, there a need for data-driven system and methods for projecting visit durations at various merchant locations and projecting travel times between the merchant locations. Furthermore, it is desirable to have systems and methods for planning an optimized sequence of errands based on the projected durations to merchant locations and travel times. Furthermore it is desirable for such systems and methods for monitoring and updating the optimized sequence to be in real time or near-real time.

It is with respect to these and other considerations that the disclosure made herein is presented.

SUMMARY OF THE DISCLOSURE

According to a first aspect, a computer implemented method is provided for determining an optimized sequence of visits by a consumer to a plurality of merchant locations irrespective of travel distance. The method is implemented by a computing device having a memory storing instructions in the form of code and a processor configured by executing the instructions therein. The method includes receiving information about the errands from a remote device that is associated with a first consumer. The received data can include a start time, a start location, a final location and identify a plurality of merchant locations that are going to be visited by the first consumer. The method also includes generating one or more models for predicting the durations of visits at each of the merchant locations that the first consumer desires to visit. The models can be generated using transaction data and consumer location data associated with one or more of a plurality of consumers at respective merchant locations. The method also includes generating one or more ordered sequences of locations to be visited by the first consumer. Each of the one or more ordered sequences begins with the start location, ends with the final location, includes at least a portion of the plurality of merchant locations, and wherein consecutive locations in a ordered sequence define respective travel segments there between. The method also includes, calculating a total duration for each of the one or more ordered sequences. The total duration can be calculated using the one or more models in view of the start time, and in view of travel times for the respective travel segments as determined from a database of travel data. In addition, the method includes identifying, based on the calculated total durations, an optimal ordered sequence from among the one or more ordered sequences. The optimal ordered sequence can have the lowest calculated total duration irrespective of a total distance of the respective travel segments. The method also includes providing the optimal ordered sequence over a network to the remote device associated with the first consumer.

According to a further aspect of the method, the step of generating the model can include identifying using the consumer location data, times of entry by the one or more of the plurality of consumers into the respective merchant locations. In addition, the method can include identifying, using the transaction data, purchase times associated with transactions performed by the one or more consumers at the respective merchant locations. In addition, the method can include calculating visit durations for the one or more consumers at the merchant locations using the times of entry and purchase times. In addition, the method can include generating the one or more models using a regression algorithm and the calculated visit durations.

According to another aspect, a system is provided for determining an optimized sequence of visits by a consumer to a plurality of merchant locations irrespective of travel distance. The system can include a non-transitory computer-readable storage medium and a processor that is configured by executing one or more software modules that include instructions in the form of code and are stored in the storage medium. In particular, the modules can include a communication module that configures the processor to receive, over a network from a remote device associated with the first consumer, a start time, a start location, a final location and the plurality of merchant locations to be visited by the first consumer. The modules can also include a database module that configures the processor to store the start time, the start location, the final location and the plurality of merchant locations to the storage medium. In addition, the database module further configures the processor to access a database including consumer location data and a database including transaction data associated with a plurality of consumers. The modules also include a modeling module that configures the processor to generate one or more models for predicting visit durations at each of the plurality of merchant locations using the transaction data and the consumer location data associated with one or more of the plurality of consumers at respective merchant locations. The modules also include an analysis module that configures the processor to generate one or more ordered sequences of locations to be visited by the first consumer. In addition, each of the one or more ordered sequences begins with the start location, ends with the final location, includes at least a portion of the plurality of merchant locations, and wherein consecutive locations in a ordered sequence define respective travel segments there between. Moreover, the analysis module further configures the processor to calculate a total duration for each of the one or more ordered sequences. In addition, the total duration is calculated using the one or more models in view of the start time, and in view of travel times for the respective travel segments as determined from a database of travel data. In addition, the analysis module further configures the processor to identify, based on the calculated total durations, an optimal ordered sequence from among the one or more ordered sequences. In particular, the optimal ordered sequence is the sequence that has the lowest calculated total duration irrespective of a total distance of the respective travel segments. The modules also include a travel module that configures the processor to determine the travel times for the respective travel segments from a database of travel data. In addition, the communication module also configures the processor to provide over a network to the remote device associated with the first consumer, the optimal ordered sequence.

These and other aspects, features, and advantages can be appreciated from the accompanying description of certain embodiments of the disclosure and the accompanying drawing figures and claims.

DETAILED DESCRIPTION OF CERTAIN EMBODIMENTS OF THE DISCLOSURE

By way of overview and introduction, embodiments described herein relate to systems and methods for planning an optimized sequence of visits (e.g., daily tasks/errands) for a consumer to a plurality of merchant locations in view of information exchanged among networked components concerning a plurality of consumers. For example, the consumer can submit to the system, using a mobile device, a list of locations that he or she has to visit that day and a start time and starting location. Rather than going down the list sequentially, the system would determine and output a suggested 'optimized' list or sequence of locations that the user should visit, the optimal route to follow while visiting each location, and the total time it would take at each location and travel in between locations. For example, assume Consumer "X" wants to visit locations A, B, and C. Consumer "X" inputs the names of locations A through C into the application. The system then processes that information with regard to information exchanged from networked components (as described below), in addition to the starting location and time of the consumer, to produce a detailed and ordered list of locations to visit, say, B, A, and then C and provides the appropriate routes to take to reduce travel time between locations. As further described herein, the systems and methods disclosed herein accomplish this by leveraging three different datasets provided by different networked components: transactional data, consumer location/tracking information, (e.g., ibeach technology and/or GPS tracking data), and travel data that includes mapping and point-of-interest (POI) data.

More specifically, the system is configured to receive an errand list from a consumer that includes information about the various merchants or merchant locations the consumer desires to visit, a start time and a start location for the trip and a final location. Based on this information, as processed by the respective networked components, the system plans an optimized sequence of visits for the consumer based on historical information about how long it ordinarily takes for consumers to make purchases at each of the merchant locations on a given day of the week and at a given time, and how long it takes to travel in between the merchant locations. One component to the planning process includes modeling, by the back-end system server using a database of consumer location data (e.g., iBeacon, GPS and the like) and user transaction data (e.g., payment card transaction data), how long it takes for consumers to make purchases at various locations. The model would also forecast check-out wait times based on historical transaction volumes for a given date and time at a given merchant location. The model can be generated as a function of time of day, store location and/or day of the year. Another component to the planning process includes modeling, by the system using a database of location/travel data (e.g., dynamic map data such as "Google maps" provided by Google Inc. of Mountain View Calif.), where each of the merchant locations is located and how long it takes to travel between the merchant locations as a function of the time of day and/or day of the year. Using the models, the system is configured to estimate how long it will take the consumer to visit each of the merchant locations on the list and can identify the most efficient order of the visits and the most appropriate route to complete the tasks/errands in the shortest total amount of time. Accordingly, the system processes historical and current travel/traffic data and the estimated visit durations across multiple user data sets to provide the user with an optimized order of visits and corresponding travel routes as opposed to sequentially running each visit.

The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather, are provided as a representative embodiment and/or arrangement for teaching one skilled in the art one or more ways to implement the systems and methods. Accordingly, aspects of the present systems and methods can take the form of an entirely hardware embodiment, a firmware embodiment, or an embodiment combining software and hardware.

Figure 1:
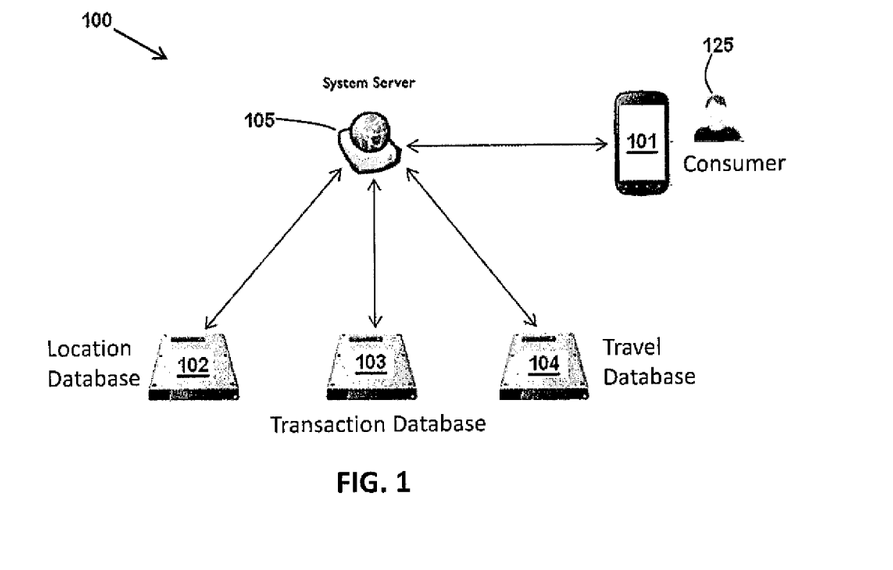
FIG. 1 is a high-level diagram illustrating an exemplary configuration of a system for planning an optimized sequence of visits in accordance with at least one embodiment disclosed herein.

An exemplary system is shown as a block diagram in FIG. 1 which is a high-level diagram illustrating an exemplary configuration of a system for daily task optimization 100. In one arrangement, the system comprises a system server 105 communicatively coupled to at least one: consumer device 101, location database 102, transaction database 103 and travel database 104. The system server 105 is a computing device and/or data processing apparatus capable of communicating with consumer devices 101, and other remote computing devices or computing networks (e.g., location database 102, transaction database 103, travel database 104), receiving, transmitting and storing electronic information and processing requests as further described herein. Similarly, location database 102, transaction database 103, travel database 104 are intended to represent various forms of computing devices including servers and/or networked or cloud based computing systems which support their respective databases, but which include processing to transform data, e.g., into a location using iBeacon responses, GPS information, and the like.

Embodiments of the methods and systems described herein, in particular, the transaction database 103, can be associated with a transaction processing subsystem that is configured to record and/or process consumer transactions between consumers and one or more merchants. For example and without limitation, transaction database 103 can be associated with a payment card network operated by MasterCard International Incorporated, of Purchase, N.Y., the assignee of the present disclosure, and can include multiple consumers' transaction data across a like number of transactions which, according to an aspect of an embodiment of the invention, is exchanged with the system server 105 and coordinated with other databases 102, 104 in order to process and arrive at relevant data to the modeling module 176 (shown in FIG. 2 and described below).

Accordingly, transaction database 103 can store information concerning purchase transactions between consumers and merchants that are conducted using a transaction card. As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold transaction account information and use technologies to deliver to a point of sale terminal the account information (e.g. NFC), such as mobile phones, smartphones, personal digital assistants (PDAs), key fobs, electronic wallets, and/or computers. Each type of transactions card can be used as a method of payment for performing a transaction. As would be understood by those skilled in the art, after a purchase has been made using a transaction card, a clearing process occurs to transfer additional transaction data related to the purchase among the parties to the transaction, such as a merchant bank, an interchange network, and issuer bank. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction, for example, in transaction database 103.

Embodiments of the methods and systems described herein, in particular, the location database 102, can be associated with a sub-system comprising hardware that is configured such as by software to determine when a visitor enters a particular merchant location and identify the visitor based on signals emitted from mobile devices (e.g., consumer device 101) and received by radio receivers positioned in and around the merchant locations. In general, when not connected to a wireless network a smart phone (e.g., consumer device 101) sends out interrogation signals attempting to locate and determine available networks. These wireless interrogations often include a unique identifier, such as, but not limited to a Media Access Control (MAC) address. These interrogation signals can be received by one or more passive receivers positioned about a merchant location, for example, inside an entry point. The strength of these signals varies with a distance away from the transceiver and may be used to determine a relative distance between the transceiver and a receiver. Based on the interrogations, the location tracking subsystem can determine a time of user entry into a merchant location as well as uniquely identify the user using device identifiers (e.g., the unique MAC addresses). Such location information can also be stored in a database, for example location database 102. Exemplary systems and methods for determining when a visitor enters a merchant location and monitoring visitor activity within a merchant location are more fully described in co-pending and commonly assigned U.S. patent application Ser. No. 14/138,342, entitled "SYSTEMS AND METHODS FOR PASSIVELY DETERMINING A RATIO OF PURCHASERS AND PROSPECTIVE PURCHASERS IN A MERCHANT LOCATION" filed Dec. 23, 2013, which is hereby incorporated by reference as if set forth in its entirety herein.

As further described herein, using the location database 102, which provides information concerning when a particular consumer enters a particular merchant location, and using the transaction database 103, which provides information concerning when a visitor makes a purchase at the merchant location, the system server 105 can exchange information from these subsystems and process it to identify a total length of a customer's visit to a particular merchant location.

Travel database 104 can be configured to receive information from the system server 105 concerning proposed locations to be visited and provide historical and current information relating to maps, points-of-interests, travel conditions and route planning between points of interest (e.g., by foot, mass transit, public transportation, automobile and the like). For example, travel database 104 can be operated by map and information service providers such as the "Google Maps" service provided by Google Inc. of Mountain View Calif. This information provides route planning information, but without regard to timing within each location at particular times on particular days of the week. The system server 105 exchanges further information concerning multiple consumers with the other databases to process the model and generate optimal ordered sequences.

Consumer device 101 can be configured to collect (and/or display) information from one or more consumers, including a particular consumer 125, communicate the information to the system server 105 and receive information from the system server. It should be understood that consumer device can be any computing device and/or data processing apparatus capable of embodying the systems and/or methods described herein, including, but not limited to, a personal computer, tablet computer or smartphone device.

At various points during the operation of system for daily task optimization 100, the system server 105 can communicate with one or more computing devices, such as devices a consumer device 101, location database 102, transaction database 103, travel database 104. Such computing devices transmit and/or receive data to/from system server 105, thereby preferably initiating, maintaining, and/or enhancing the operation of the system for daily task optimization 100, as will be described in greater detail below. It should be understood that any of the computing devices (e.g., 101, 102, 103, 104) can be in direct communication with system server 105, indirect communication with system server 105, and/or can be communicatively coordinated with system server 105 through a computer network such as the Internet.

It should be noted that while FIG. 1 depicts system for daily task optimization 100 with respect to a consumer device 101, location database 102, transaction database 103, travel database 104, it should be understood that any number of such computing devices 101 and/or databases can interact in the manner described herein. It should also be noted that while FIG. 1 depicts a system for daily task optimization 100 with respect to a particular consumer 125, it should be understood that any number of consumers can interact with the with system for daily task optimization 100 in the manner described herein. It should be further understood that a substantial number of the operations described herein are initiated by and/or performed in relation to such consumer computing devices. For example, as referenced above, such computing devices can execute applications and/or viewers that request and/or receive data from system server 105, substantially in the manner described in detail herein.

It should be further understood that while the various computing devices and machines referenced herein, including but not limited to, system server 105, consumer device 101, location database 102, transaction database 103, and travel database 104 are referred to herein as individual/single devices and/or machines, in certain implementations the referenced devices and machines, and their associated and/or accompanying operations, features, and/or functionalities can be combined or arranged or otherwise employed by one or more of the computing devices and/or across any number of devices and/or machines, such as over a network connection, as is known to those of skill in the art.

Figure 2:
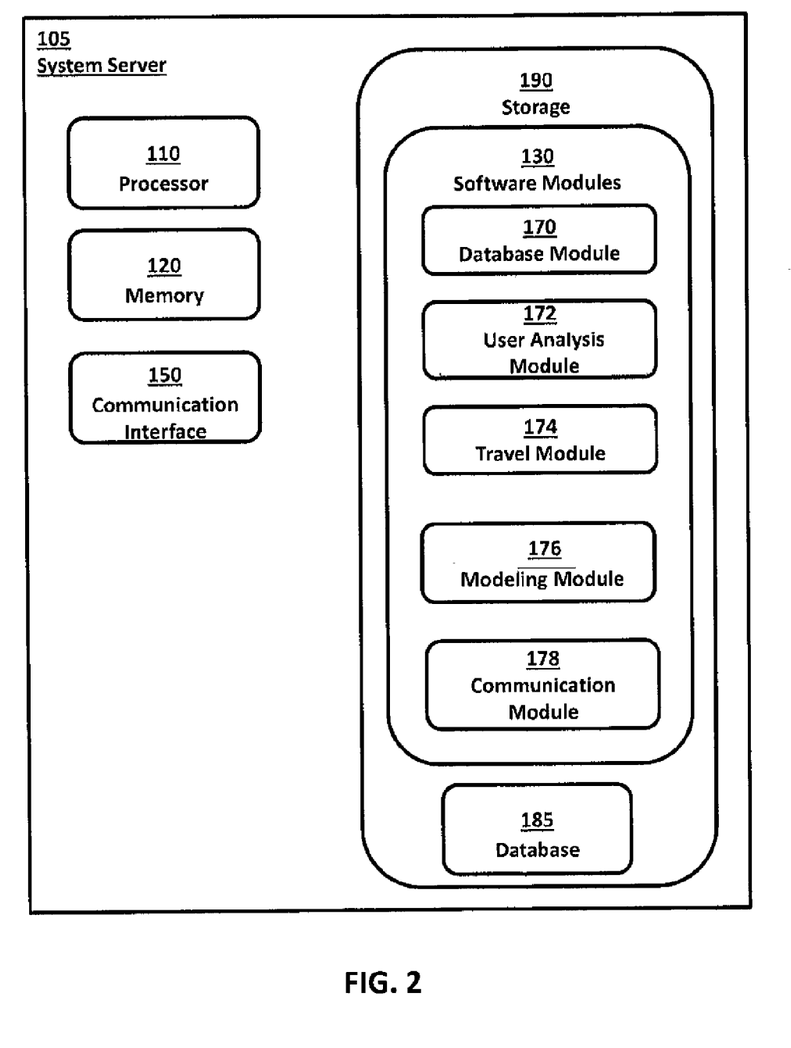
FIG. 2 is a block diagram illustrating an exemplary configuration of a system for planning an optimized sequence of visits in accordance with at least one embodiment disclosed herein.

In reference to FIG. 2, system server 105 of the system for daily task optimization 100 is arranged with various hardware and software components that serve to enable operation of the system 100, including a hardware processor 110, hardware memory 120, hardware storage 190 and a communication interface 150. Processor 110 serves to execute software instructions that can be loaded into memory 120. Processor 110 can be a number of processors, a multi-processor core, or some other type of processor, depending on the particular implementation.

Preferably, memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more hardware components or devices such as a hard drive, a flash memory, a rewritable optical disk, a rewritable magnetic tape, or some combination of the above. Storage 190 also can be fixed or removable or remote such as cloud based data storage systems.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages. The program code can execute entirely on system server 105, partly on system server 105, as a stand-alone software package, partly on system server 105 and partly on a remote computer/device such as consumer device 101, or any computing devices maintaining the location database 102, transaction database 103 and travel database 104 or entirely on such the remote computing devices. In the latter scenario, the remote computer can be connected to system server 105 through any type of network, including a local area network (LAN) or a wide area network (WAN), or the connection can be made to an external computer (for example, through the Internet using an Internet Service Provider).

Preferably, included among the software modules 130 is a database module 170, a user analysis module 172, a travel module 174, a modeling module 176 and a communication module 178 that are executed by processor 110. During execution of the software modules 130, the processor 110 configures the system server 105 to perform various operations relating to the system for daily task optimization, as will be described in greater detail below. The program code of software modules 130 and one or more computer readable storage devices (such as memory 120 and/or storage 190) can form a computer program product that can be manufactured and/or distributed in accordance with the present disclosure, as is known to those of ordinary skill in the art.

It should be understood that in some illustrative embodiments, one or more of software modules 130 can be downloaded over a network to storage 190 from another device or system via communication interface 150 for use within the for daily task optimization system 100. In addition, it should be noted that other information and/or data relevant to the operation of the present systems and methods (such as user database 185) can also be stored on storage 190, as will be discussed in greater detail below.

Also preferably stored on storage 190 is a user database 185. As will be described in greater detail below, the user database 185 contains and/or maintains various data items and elements that are utilized throughout the various operations of the system 100. The information stored in the user database 185 can include, but is not limited to, user profiles, transaction data, location data, travel data, and other data relating to consumers, as will be described in greater detail herein. It should be noted that although the user database 185 is depicted as being configured locally to the system server 105, in certain implementations, the user database 185 and/or various of the data elements stored therein can be located remotely (such as on a remote device or server—not shown) and connected to the system server 105 through a network in a manner known to those of ordinary skill in the art.

Communication interface 150 is also operatively connected to the processor 110 and can be any interface that enables communication between the system server 105 and external devices, machines and/or elements including remote devices 101, 102, 103 and 104. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting system server 105 to other computing devices and/or communication networks, such as private networks and the Internet. Such connections can include a wired connection or a wireless connection (e.g., using the IEEE 802.11 standard), though it should be understood that communication interface 150 can be practically any interface that enables communication to/from the system server 105.

The communication interface 150 enables the exchange of information from third party components, such as iBeacon sensor devices and the networks with which such devices communicate. This enables the system 100 to model and generate one or more ordered sequences so that an optimum plan can be established for a particular consumer with the benefit of information from a plurality of other consumers.

The operation of the system for daily task optimization 100 and the various elements and components described above will be further appreciated with reference to the method for system for daily task optimization 100 as described below, in conjunction with FIG. 3.

At some point prior to conducting the methods for daily task optimization in accordance with at least one embodiment disclosed herein, one or more of the consumers (e.g., consumer 125) can enroll to participate in the services facilitated by the system 100. For example, a consumer can do this by connecting to system server 105 using a consumer device 101 and actively providing personal information, such as, transaction account information and/or device information useable to identify the user among a plurality of consumers known to the location database 102 and the like. It should be understood that, alternatively, the individuals can simply provide a few key pieces of personal information, such as a name and/or transaction card number and grant permission for the system server 105 to access his or her spending records and/or location data from the appropriate data storage devices (e.g., transaction database 103 or location database 102). In addition, the particular consumer's information can be automatically made available to the system by virtue of having a payment card issued by a participating card issuer. Using either personal information or transaction information, system server 105, via a transaction processing company, card issuer, and the like, can automatically retrieve spending records for the particular consumer. As used herein, a transaction processing company is an entity that may perform certain processing functions in connection with a financial transaction on behalf of financial institution, merchant, customer and the like. Any automatic access to a consumer's spending records or medical information would be subject to applicable data privacy and data usages laws.

It should be understood that spending records and/or location data can be provided by the consumer or also received directly from a participating payment service provider company, with the appropriate consents from the consumer. It should also be understood that the consumer can also require authorization before the system server retrieves spending records and/or location information. Thus, it should be apparent that in the exemplary system and routine described herein, depending on applicable laws and regulations, a consumer can opt in, thereby consenting to the use of their spending records as well as any other personal information he or she provides.

For situations in which the systems discussed here collect personal information about individuals, the individuals may be provided with an opportunity to control the manner such information is collected with respect to programs or features that may collect personal information (e.g., information about an individual's location data, spending records or an individual's current location/address). Individuals may also be informed of the accompanying limitations on the functionality of a service that may result from limiting access to such personal information. In addition, certain data may be anonymized in one or more ways before it is stored or used, so that personally identifiable information is removed. For example, identifiers associated with an individual's identity, transaction records and/or mobile device location records may be anonymized so that no personally identifiable information can be determined for the individuals.

As noted above, the systems and methods disclosed herein plan optimized sequences of visits for a user by leveraging three different datasets: transactional data from the transaction database 103, location data for users stored in a location database 102 (e.g., ibeach data, GPS tracking data) and travel data stored in a travel database 104. One component to the planning process includes modeling how long it takes for consumers to make purchases at various locations, by the back-end system server using a database of location data 102 (e.g., iBeacon, GPS and the like) and user transaction data (e.g., payment data) from the transaction database 103. The model can be generated as a function of time of day and/or day of the year. Another component to the planning process includes modeling, by the system using a database of location/travel data (e.g., dynamic map data such as "Google Maps"), the locations of each of the merchant and how long it takes other consumers to travel between the merchant locations as a function of the time of day and/or day of the year. Using the models, the system is configured to estimate how long it will take the particular consumer to visit each of the merchant locations on the list and can algorithmically identify the most efficient order of the visits and the most appropriate route to complete the tasks/errands in the shortest total amount of time. Accordingly, the system uses historical and current travel/traffic data and the estimated visit durations extracted from profiles and data sets of other consumers to provide the particular consumer with an optimized order of visits and corresponding travel routes as opposed to sequentially running each visit.

Figure 3:
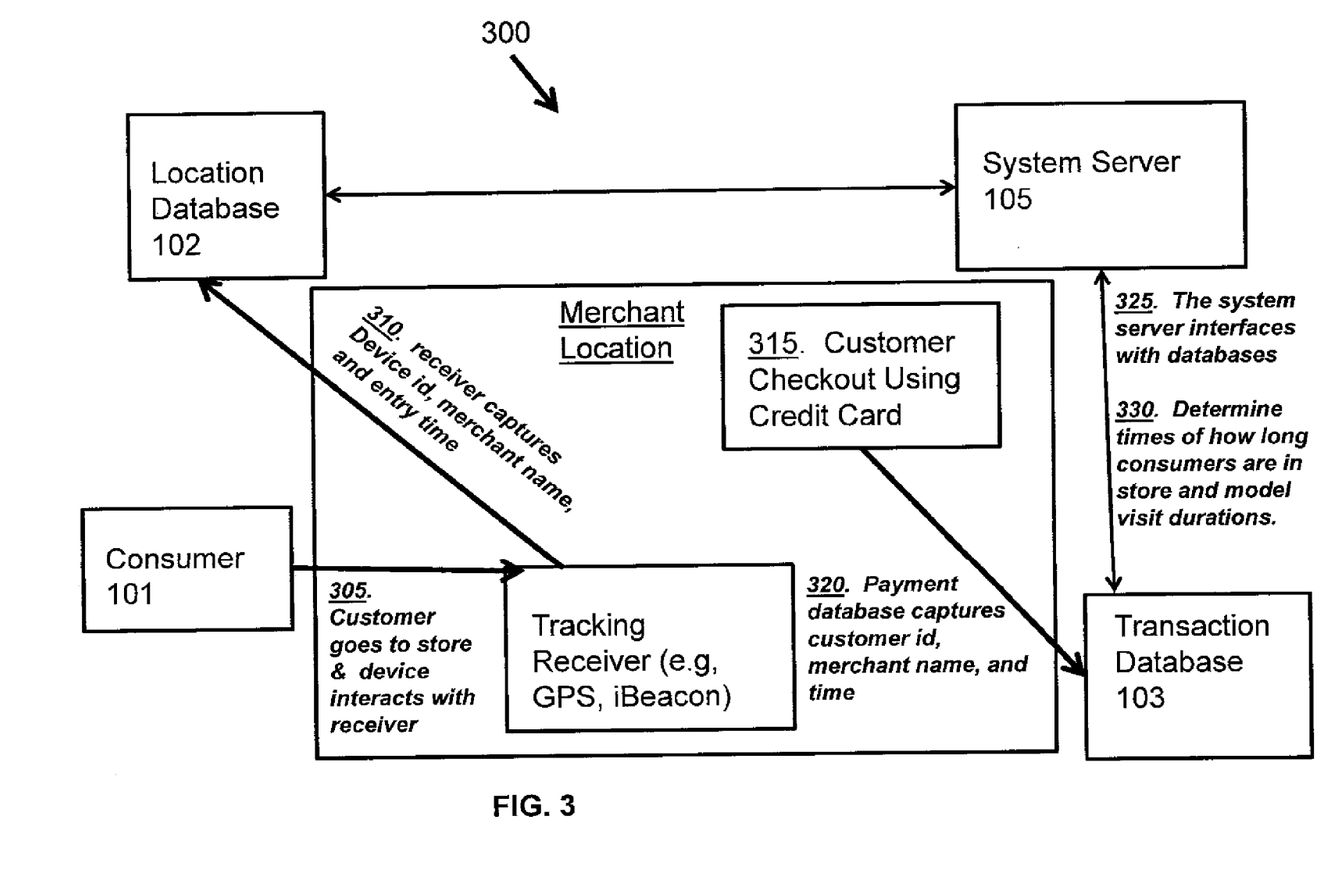
FIG. 3 is a flow diagram illustrating a process for determining and modeling the duration of consumer visits at a merchant locations in accordance with at least one embodiment disclosed herein.

Turning now to FIG. 3, a flow diagram illustrates an exemplary process flow 300 for modeling the duration of visits by consumers to a store in accordance with at least one embodiment disclosed herein.

At step 305 one or more consumers enter a merchant location. At step 310, consumer location information for the one or more consumers can be captured by a location tracking subsystem at the merchant location. The captured information can be stored in the location database 102. More specifically, as noted above, in some implementations, interrogation signals from the consumers' respective mobile computing devices (e.g., consumer device 101) attempting to locate and determine available networks can be received by one or more passive receivers positioned about respective merchant locations. Based on the unique identifier included in the interrogations and associated time-stamps, the location tracking subsystem can determine a time of consumer entry into a merchant location, as well as uniquely identify the user using device identifiers (e.g., the unique MAC addresses for the consumer device) and store the information in a database, for example location database 102. Alternatively, for example, consumers can be incentivized to actively check in with location tracking system using respective consumer devices upon entry to a merchant location.

In addition, at step 315, the one or more consumers conduct transactions at the merchant location using, for example, a transaction card at a point of sale terminal, and a record of the payment transaction can be stored in the transaction database 103 at step 320. As noted above, the transaction database 103 can be operated by a payment service provider, such as MasterCard International Incorporated. Each record of a transaction can include information identifying a respective consumer, information identifying a respective merchant, a respective merchant location, an associated transaction time and other such information that describes the transaction and the parties. Transaction records are not limited to any single payment method and the transaction records associated with each consumer can include transactions using a variety of payment methods, such as a credit card, a debit card, a prepaid card, a gift card, bank account bill-pay service, ACH payment, a TSM account, contactless payment, a virtual account number, electronic wallet transaction, cash or a combination of the foregoing.

At step 325, the system server processor 110, which is configured by executing one or more software modules 130 including, preferably, the database module 170, and the communication module 178, can maintain a database of consumer profiles that link, for the consumers, respective transaction records stored in the transaction database 103 and respective location records stored in the location database 102. As noted above, the "identity" of the consumers can be anonymized so that no personally identifiable information can be determined for the consumers from the transaction database 103 or the location database 102 or the profiles and information maintained by the system server 105. More specifically, using the location database 102 and transaction database 103, unique user IDs (UIDs) can be created by the configured processor and associated with corresponding identifiers maintained by the location tracking and transaction processing platforms. For example, one exemplary way to create UIDs that link instances from different platforms comprises unique redemption (e.g., coupon) offers to consumers, say, for a MasterCard payment card or mobile wallet application when the consumer steps into a merchant location and provides information identifying their consumer device. Then, when the coupon is redeemed or the transaction has occurred, the configured processor can create a UID to associate the user's mobile device and transaction account identifier. It can be appreciated that alternative methods for linking a location tracking account and transaction accounts for a consumer are envisioned.

At step 330, the system server 105 can determine the duration of each consumer visit to respective merchant locations using the database of location information and database of transaction information. In particular, the processor 110, which is configured by executing one or more of the software modules 130 including, preferably, the analysis module 172 and the modeling module 176, can calculate the duration of a visit by a consumer to a merchant location using the timestamps indicating when the consumer entered into the merchant location and the transaction time associated with the purchase made by the consumer at the merchant location. By aggregating the calculated visit duration for a plurality of users at a plurality of merchant locations, the configured processor can analyze the visit durations and algorithmically generate models that provide real-time estimations of how long the consumers take while they shop at respective merchant locations. The analysis can be performed using any number of mathematical analysis techniques, including regression modeling and other such statistical analysis tools, as would be understood by those in the art. In addition, the configured processor can be configured to segment the information based on time of day, date, day of the week, user profile information (e.g., demographics and the like), merchant location, and other such segmentation variables, as understood by those in the art. By way of further example, the configured processor can segment the data being analyzed or the results according to demographic data relating to the consumers that can include, but is not limited to, the particular consumer's age, address, location, education level, occupation, and family-related data, such as marital status and number of children and the like. Such demographic data can be determined by analyzing the transaction records retrieved from the transaction database 103 and/or can be obtained from third party providers of such information or from the consumers themselves.

In addition, the analysis of the visit duration data and generation of the models can also include calculating a confidence level for the one or more models by the configured processor. For example, the confidence level can be calculated based on the statistical sufficiency of the information that was used to generate the model. Accordingly, the confidence level can represent the reliability of a model for predicting visit durations and can ultimately be used by the system to identify the optimized sequence of errands in view of the reliability of the projected visit durations. Similarly, the configured processor can select an alternative merchant location to be included into the optimized sequence based on the reliability of the model.

In addition, in the event that the visit duration data for a particular merchant location is insufficient to accurately model visit durations, the configured processor can also predict visit durations based on one or more other merchant locations that are related to the particular merchant location. For example, the average visit duration at a particular Sears store during peak holiday hours can be determined based on the model(s) projecting visit durations at one or more other Sears stores in the area or similar department stores.

Figure 4:
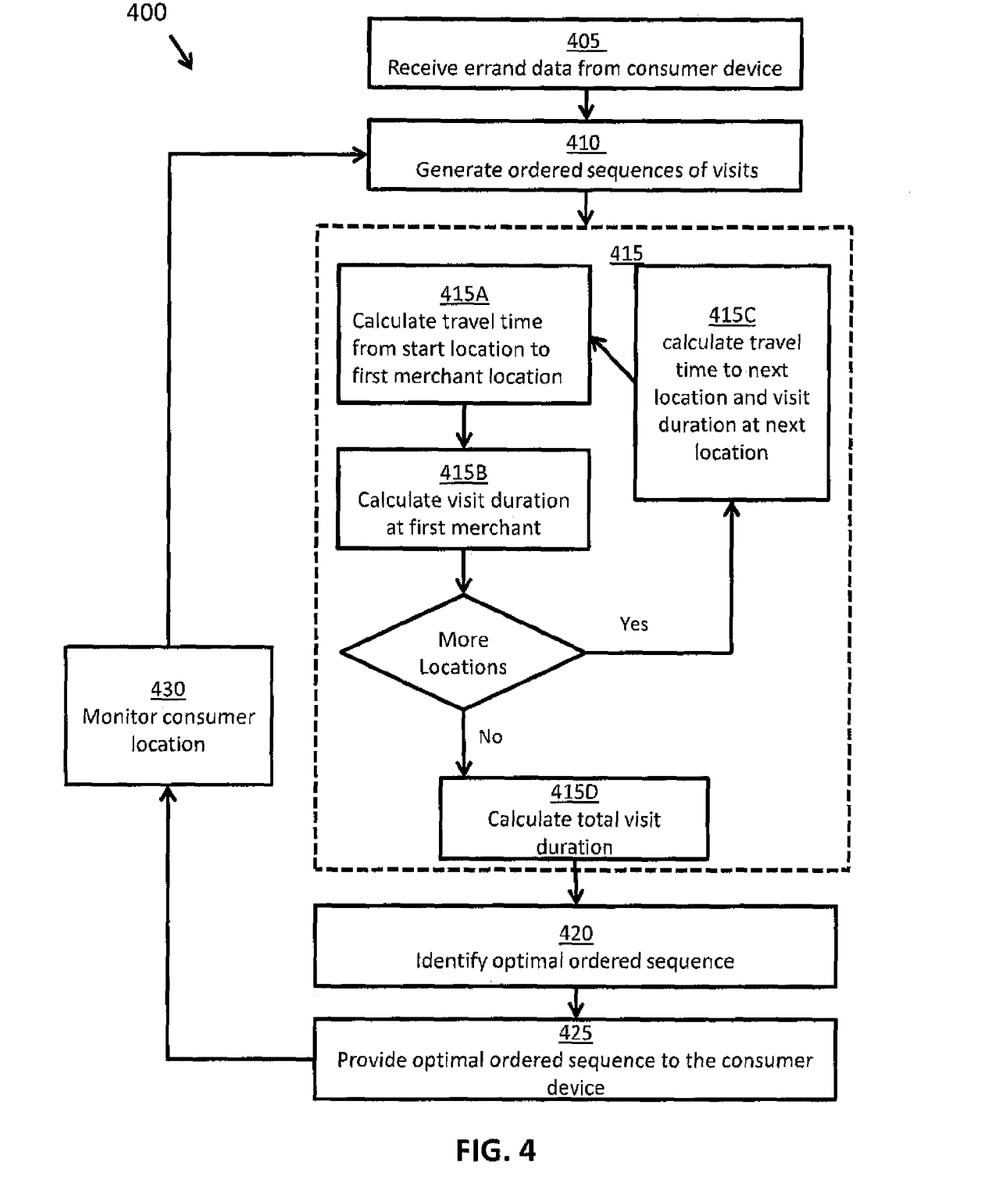
FIG. 4 is a flow diagram illustrating a routine for planning an optimized sequence of visits in accordance with at least one embodiment disclosed herein.

Turning now to FIG. 4, a flow diagram illustrates an exemplary method 400 for generating an optimized sequence of visits by a first consumer to a plurality of merchant locations irrespective of travel distance in accordance with at least one embodiment disclosed herein.

The process begins at step 405, in which the processor 110, which is configured by executing one or more of the software modules 130, including, preferably, the communication module 178, and the database module 170, receives errand data from a consumer concerning the errands that the consumer would like to run. In some implementations, the errand data is actively provided to the system server 105 by the consumer using a mobile device, e.g., consumer device 101 over a network. It can be appreciated that the consumer device 101 can be configured to connect with the system server 105 via a client application executing on the consumer device or similar software applications or portals (e.g., a web-browser based application) that also facilitate the capture of the errand data from the consumer. The errand data can include a start time and/or date that the consumer would like to begin the sequence of errands (e.g., visits), a start location for the consumer, a final location (i.e., where the user desires to end the sequence, say, home or another destination), The errand data also includes information that can be used to identify a plurality of intervening locations that the consumer desires to visit in between departing from the start location and arriving at the final location, for example merchant locations to be visited.

In some implementations, the information that can be used to identify the plurality of merchant locations can include the names of the merchants and/or the corresponding locations of the merchants. In addition or alternatively, if the user is flexible regarding which particular merchant location is visited, the user can provide a merchant name (e.g., "Sears") or provide a type of merchant (e.g., "pharmacy" or "hardware store"). Accordingly, based on the merchant name or merchant type and an approximate location, the configured processor 110 can automatically identify a corresponding merchant location. For example, the configured processor 110 can query the travel database 104 (e.g., the Google Maps service that includes travel information and point of interest information) and for each named merchant/type provided in the errand data, identify corresponding merchant locations that are in the vicinity of the start location, final location and/or intermediate or surrounding areas. Moreover, if a plurality of merchant locations fit the criteria specified in the errand data, the configured processor can select a particular merchant location that reduces the total duration of the sequence of errands or otherwise optimizes the sequence of errands to be performed by the user, as further described herein. In other implementations, the consumer can provide a list of items to purchase and these items can be mapped to merchants and their respective locations.

Then at step 410, one or more ordered sequences of locations to be visited by the consumer are generated. More particularly, the processor 110, which is configured by executing one or more of the software modules 130, including, preferably, the analysis module 172, generates one or more ordered sequences of locations defined by the errand data. Preferably, each of the one or more ordered sequences begins with the start location and ends with the final location and includes at least a portion of the plurality of merchant locations. The consecutive locations in an ordered sequence define respective travel segments between the consecutive locations. Accordingly, it can be appreciated that the one or more ordered sequences represent possible sequences of visits by the consumer to the merchant locations and travel from one location to the next.

In some implementations, the one or more ordered sequences can be generated to include each of the plurality of merchant locations, for example, if the consumer needs to visit every location. In some implementations, at least a portion of the plurality of merchant locations is included in the sequences. For example, the configured processor 110 can include merchant locations in the ordered sequences in accordance with respective priorities. The respective priorities can be received by the configured processor from the consumer using the consumer device 101 as part of the errand data or separately. The respective priorities can specify how important it is for the consumer to visit a particular merchant location. For example, the user can specify that the bank is a high priority whereas visiting the dry cleaners is a low priority. Accordingly, the system can include or omit a merchant location from the sequence of errands accordingly, for example, if it would increase the length of the errands significantly.

In some implementations, the system can generate sequences that correspond to all of the possible permutations of ordered locations, however, it can be appreciated that the configured processor 110 can selectively generate a limited number of ordered sequences. For example, the ordered sequences can be generated based on geographic proximity to the start or final location, or based on the geographic proximity of merchant locations to one-another. In some implementations, the configured processor can identify one or more alternative merchant locations to those specified by the consumer and generate sequences using the one or more alternative locations. As further described herein, the system can project the total duration for each of the ordered sequences and select one or more optimized ordered sequences for the consumer to follow.

At step 415, the total duration of the one or more ordered sequences is determined. In particular, the processor 110, which is configured by executing one or more of the software modules 130, including, preferably, the database module 170 and the analysis module 172, the travel module 174 and the modeling module 176 can calculate, for each of the one or more ordered sequences, a total duration based on the start time and the locations in respective sequences using the models for estimating the durations of visits at merchant locations and based on the database of travel data 104.

As shown at step 415A, calculating the total duration for a particular sequence can include calculating the duration of the travel time from the start location to the first merchant location in the sequence based on the start time. For example, using the start time and start location and the location of the ensuing visit in the sequence, the processor 110, which is configured by executing one or more of the software modules 130, including, the travel module 174, can query the travel database 104 to determine the projected travel time. Accordingly, the configured processor 110 can calculate the projected arrival time at the first merchant location in the sequence. As would be understood by those skilled in the art, the projected travel time can be determined based on current or historical travel conditions stored in the travel database 104. In addition, step 415A can also include determining, by the configured processor 110 using the travel database 104, a preferred route for the travel segment, for example, if a number of possible routes are available. Accordingly, the estimated travel time for each of the travel segments is determined based on the preferred route.

Based on the projected arrival time, at step 415B, the configured processor can calculate the duration of the visit at the first merchant location in the sequence. More specifically, the processor 110, which is configured by executing one or more of the software modules 130, including, the travel module 174, can calculate the predicted visit duration using the one or more of the models that were generated to project visit durations at the merchant location as described in relation to FIG. 3. More specifically, these models are provided with information exchanged between the system server 105 and one or more subsystems in order to receive and process relevant information for calculating duration of visit at any given time and date. Based on the estimated arrival time and the calculated visit duration, the configured processor can calculate the consumer's estimated departure time from the first merchant location.

At step 415C, the configured processor iteratively repeats steps 415A and 415B to calculate visit durations for the remaining merchant locations in the ordered sequence based on the start time, a visit duration calculated for any preceding merchant locations in the ordered sequence based on the calculated travel times for any preceding travel segments. Similarly, the configured processor iteratively calculates, using the database of travel data 104, a travel time for each of the travel segments in the ordered sequence based on the start time, the calculated visit duration for any preceding visits to merchant locations and the calculated travel times for any preceding travel segments. As will be appreciated, the order of the location to visit influences the arrival time at a given location and, hence the predicted duration of the visit when arriving at the computed arrival time.

Then, at step 415D, the configured processor calculates the total visit duration for each of the one or more ordered sequences. For example, the processor 110, which is configured by executing one or more of the software modules 130, including, the analysis module 172, can calculate the total visit duration by aggregating the calculated travel time for each of the travel segments and the calculated visit durations at each of the merchant locations in the one or more ordered sequences.

At step 420, an optimal ordered sequence from among the one or more ordered sequences is identified based on the respective calculated total visit durations. In some implementations, the selected optimal ordered sequence is the sequence that has the lowest calculated total duration irrespective of a total distance of the respective travel segments. More specifically, the processor 110, which is configured by executing one or more of the software modules 130, including, preferably, the analysis module 172, can compare the calculated total durations for the one or more ordered sequences to identify the ordered sequence with the lowest total duration.

In some implementations, the optimal ordered sequence can be selected as a function of the total duration and in view of additional selection parameters. The selection parameters can include, for example and without limitation, a confidence level ascribed to the calculated total visit durations, the total travel distance and whether the ordered sequence includes some or all of the merchant locations. More specifically, the calculated total duration for a particular ordered sequence can be weighted or adjusted based on the confidence level associated with respective calculated visit durations at one or more merchant locations. Accordingly, if the configured processor determines that multiple ordered sequences have a comparable total duration (e.g., is within a prescribed range), the configured processor 110 can select the ordered sequence that has the highest associated confidence level (e.g., the one with the most reliable projection of time). By way of further example, the optimal ordered sequence can be selected based on the total travel distance. By way of further example, the configured processor can select the ordered sequence that includes the most high-priority visits to merchant locations. It can be appreciated that the above methods for selecting an optimal sequence as a function of total duration, travel distance, reliability, priority of the visits and/or number of merchant locations included in the sequence are exemplary and alternative methods for selecting an optimal sequence can be implemented without departing from the scope of the disclosed embodiments.

In some implementations, the errand data provided by the consumer can include additional constraints, such as a time that the sequence must be finished by or one or more additional locations-of-interest that the consumer must visit during the trip. The locations-of-interest can be any location that a consumer will visit, for example a school, restaurant, office and the like and the consumer. In addition, the errand data can also include a time and duration of each visit to the locations-of-interest. Accordingly, the configured processor can arrange the sequence of merchant locations to be visited in accordance with the constraints. For example, the errand data might provide that the consumer wishes to visit a plurality of merchant locations, start the errands from a home location at 1:00 PM and return to the home location by 6:00 PM and provide that the consumer must visit the local elementary school at 3:15 PM for 30 minutes before continuing the errands. Based on the foregoing example, the configured processor 110 can plan the sequence of visits to the merchant locations in view of the 30 minute stop to the local school at 3:15 PM, for example, by breaking down the trip into smaller segments (e.g., 1:00 PM departure from home location to 3:15 PM arrival at school and 3:45 departure from school to home location by 6:00 PM) and selecting merchant locations to be visited in each segment so as to comply with the constraints.

At step 425, the optimal ordered sequence(s) from among the one or more ordered sequences are provided to the consumer. More specifically, the processor 110, which is configured by executing one or more of the software modules 130, including, preferably, the communication module 178, can transmit at least the optimal ordered sequence to the consumer device 101 for presentation to the consumer. In addition, the configured processor can also provide alternative sequences of visits to the consumer. For example, the fastest sequence of visits that includes all merchant locations in the errand data, the fastest sequence of visits that includes all high priority merchant locations to be visited, the sequence of visits selected based on total duration and the least total travel distance. In addition, the configured processor can also present to the consumer via the consumer device 101, one or more ordered sequences that include alternative merchant locations that further optimize the sequence of errands.

In addition, the configured processor 110 can receive, from the consumer device 101 over a network, a selection by the consumer of the at least one optimal ordered sequence or additional instructions or modifications to the errand data or presented sequences. Based on the received instructions, the configured processor can revise or re-calculate the optimized sequences and present the revised sequences to the user. Based on the received selection, the configured processor can present additional details concerning the particular sequence and associated route(s).

In addition, at step 430, the location of the consumer can be monitored as the consumer is running errands according to the selected optimal ordered sequence. More specifically, the processor 110, which is configured by executing one or more of the software modules 130, including, preferably, the analysis module 172 and the communication module 178, can determine a current location of the consumer as the consumer visits the plurality of merchant locations identified in the sequence in near real time. A user's current location can be received from the consumer device 101 (e.g., GPS data) or can be determined by the configured processor using information gathered from the location database 102 and/or the transaction database 103. Using the current location, the configured processor can determine whether the consumer is running the errands in a manner that is consistent with the optimized sequence selected by the consumer. For example, the configured processor can determine whether the consumer has spent more than the predicted amount of time at one or more merchant locations.

(Based on the current location of the consumer and the merchant locations already visited, the processor 110, which is configured by executing one or more of the software modules 130, including, preferably, the analysis module 172, the travel module 174, the modeling module 176 and the communication module 178, can repeat the steps of: generating the one or more ordered sequences, calculating the total duration, and identifying an optimal ordered sequence for the remaining merchant locations. Accordingly, the configured processor can dynamically refine the optimal sequence based on the consumer's location data, real-time and historical travel information and the models for predicting visit durations and provide the refined optimal ordered sequence to the consumer device 101.

Accordingly it can be appreciated that the system server 105, in conjunction with the consumer device 101 and location database 102, transaction database 103 and travel database 104, is configured to plan optimized sequence of errands and actively track current progress of the consumer and the conditions of the environment (e.g., travel conditions, current time etc.) and update the optimized sequence to aid the consumer in completing the tasks/errands in an efficient/more optimal manner.

At this juncture, it should be noted that although much of the foregoing description has been directed to systems and methods for task optimization in which a consumer visits merchant locations, the systems and methods disclosed herein can be similarly deployed and/or implemented in scenarios, situations, and settings far beyond the referenced scenarios of visiting merchant locations.

It should be appreciated that more or fewer operations can be performed than shown in the figures and described. These operations can also be performed in a different order than those described. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product for determining optimized sequences of tasks. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the following claims.

What is claimed is:

1. A computer-implemented method for determining an optimized sequence of visits by a first consumer to a plurality of locations irrespective of travel distance, the method being implemented by a computing device having a memory storing instructions in the form of code and a processor configured by executing the instructions therein, the method comprising:

receiving, by the configured processor over a network from a remote device associated with the first consumer, a start time, a start location, a final location and the plurality of intervening locations to be visited by the first consumer;

generating, by the configured processor, one or more models for predicting visit durations at each of the plurality of locations using transaction data and consumer location data associated with one or more of a plurality of consumers other than the first consumer being at respective intervening locations;

generating, by the configured processor, one or more ordered sequences of locations to be visited by the first consumer, wherein each of the one or more ordered sequences begins with the start location, ends with the final location, includes at least a portion of the plurality of intervening locations, and wherein consecutive locations in a ordered sequence define respective travel segments there between;

calculating, by the configured processor, a total duration for each of the one or more ordered sequences, wherein the total duration is calculated using the one or more models in view of the start time, and in view of travel times for the respective travel segments as determined from a database of travel data; and identifying, by the configured processor based on the calculated total durations, an optimal ordered sequence from among the one or more ordered sequences, wherein the optimal ordered sequence has the lowest calculated total duration irrespective of a total distance of the respective travel segments; and providing, by the configured processor over a network to the remote device associated with the first consumer, the optimal ordered sequence.

2. The method of claim 1, wherein the intervening locations to be visited by the first consumer are merchant locations and wherein the step of generating the one or more models comprises:

identifying, by the configured processor using the consumer location data, times of entry by the one or more of the plurality of consumers into the respective merchant locations;

identifying, by the configured processor using the transaction data, purchase times associated with transactions performed by the one or more consumers at the respective merchant locations;

calculating, by the configured processor, using the times of entry and purchase times, visit durations for the one or more consumers at the merchant locations;

wherein the generating step generates the one or more models using a regression algorithm and the calculated visit durations.

3. The method of claim 1, wherein the one or more models are generated based on segmentation variables including one or more of: time of day; date; user profile; and intervening location.

4. The method of claim 1, further comprising:

calculating a confidence level for the one or more models by the configured processor, wherein the calculated total durations are calculated in accordance with the confidence level associated with the one or more models.

5. The method of claim 1, wherein the step of calculating the total duration for the ordered sequence comprises:

calculating, by the configured processor using the one or more models, a visit duration for each of the intervening locations in the ordered sequence based on the start time, a visit duration calculated for any preceding intervening locations in the ordered sequence and in view of travel times determined for any preceding travel segments; and determining, by the configured processor using the database of travel data, a travel time for each of the travel segments in the ordered sequence based on the start time, a calculated visit duration for any preceding intervening locations in the ordered sequence and determined travel times for any preceding travel segments.

6. The method of claim 1, wherein the step of determining travel times for each of the travel segments in a respective ordered sequence further comprises:
   determining, by the configured processor using the database of travel data, a preferred route for each of the travel segments; and
   wherein the estimated travel time for each of the travel segments is determined based on the preferred route.

7. The method of claim 1, further comprising:
   identifying an alternative location for one or more of the plurality of intervening locations, by the configured processor using at least one of the database of travel data, the location data and the transaction data.

8. The method of claim 1, wherein the step of generating the one or more ordered sequences comprises:
   generating, by the configured processor, a plurality of permutations of the respective intervening locations; and
   generating, by the configured processor, a plurality of ordered sequences of locations based on the generated permutations.

9. The method of claim 1, further comprising:
   identifying, by the configured processor, one or more alternative intervening locations for the one or more of the plurality of intervening locations;
   generating, by the configured processor, one or more alternative ordered sequences of locations based on the one or more alternative intervening locations; and
   calculating, by the configured processor, a total duration for each of the one or more alternative ordered sequences.

10. The method of claim 1, wherein the at least a portion of the plurality of intervening locations are included in the sequence, by the configured processor, in accordance with respective priorities received from the remote device associated with the first consumer.

11. The method of claim 1, wherein the one or more ordered sequences includes each of the plurality of intervening locations.

12. The method of claim 1, wherein the database of travel data includes current travel data and historic travel data.

13. The method of claim 1, further comprising:
   receiving, by the configured processor, a current location of the user as the first consumer visits the plurality of intervening locations;
   refining the optimal ordered sequence based on the current location of the first consumer by repeating the steps of: generating the one or more ordered sequences, calculating the total duration, and identifying an optimal ordered sequence; and
   providing the refined optimal ordered sequence to the remote device associated with the first consumer.

14. The method of claim 1, wherein the intervening locations to be visited by the first consumer are merchant locations.

15. A system for determining an optimized sequence of visits by a first consumer to a plurality of intervening locations irrespective of travel distance comprising:
   a non-transitory computer-readable storage medium;
   a processor configured by executing one or more software modules including instructions in the form of code stored in the storage medium, the modules including:
      a communication module that configures the processor to receive over a network from a remote device associated with the first consumer, a start time, a start location, a final location and the plurality of intervening locations to be visited by the first consumer;
      a database module that configures the processor to store the start time, the start location, the final location and the plurality of intervening locations to the storage medium, and wherein the database module further configures the processor to access a database including consumer location data and a database including transaction data associated with a plurality of consumers;
      a modeling module that configures the processor to generate one or more models for predicting visit durations at each of the plurality of intervening locations using the transaction data and the consumer location data associated with one or more of the plurality of consumers other than the first consumer being at respective intervening locations;
      an analysis module that configures the processor to generate one or more ordered sequences of locations to be visited by the first consumer, wherein each of the one or more ordered sequences begins with the start location, ends with the final location, includes at least a portion of the plurality of intervening locations, and wherein consecutive locations in a ordered sequence define respective travel segments there between,
         wherein the analysis module further configures the processor to calculate a total duration for each of the one or more ordered sequences, wherein the total duration is calculated using the one or more models in view of the start time, and in view of travel times for the respective travel segments as determined from a database of travel data, and
         wherein the analysis module further configures the processor to identify based on the calculated total durations, an optimal ordered sequence from among the one or more ordered sequences, wherein the optimal ordered sequence has the lowest calculated total duration irrespective of a total distance of the respective travel segments;
      a travel module that configures the processor to determine the travel times for the respective travel segments from a database of travel data; and
      wherein the communication module further configures the processor to provide over a network to the remote device associated with the first consumer, the optimal ordered sequence.

16. The system of claim 15, wherein the intervening locations to be visited by the first consumer are merchant locations and wherein the modeling module further configures the processor to generate the one or more models by:
   identifying using the consumer location data, times of entry by the one or more of the plurality of consumers into the respective merchant locations;
   identifying purchase times associated with transactions performed by the one or more consumers at the respective merchant locations using the transaction data;
   calculating visit durations for the one or more consumers at the merchant locations using the times of entry and purchase times; and
   generate the one or more models using a regression algorithm and the calculated visit durations.

17. The system of claim 15, wherein the analysis module further configures the processor to:
   receive a current location of the user as the first consumer visits the plurality of intervening locations;
   refine the optimal ordered sequence based on the current location of the first consumer by repeating the steps of:

generating the one or more ordered sequences, calculating the total duration, and identifying an optimal ordered sequence; and provide the refined optimal ordered sequence to the remote device associated with the first consumer.

* * * * *